Dec. 17, 1957     A. KÖBERLE     2,816,586
SLIDABLY AND ROTATABLY ADJUSTABLE WORK HOLDING STRUCTURE
Filed Nov. 7, 1955
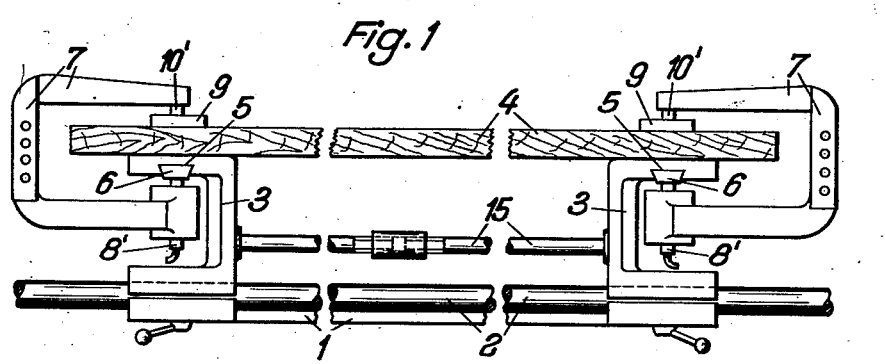
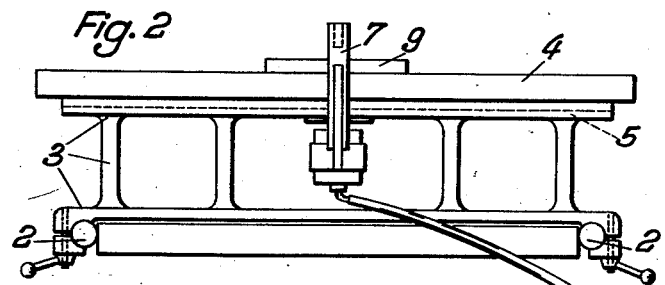
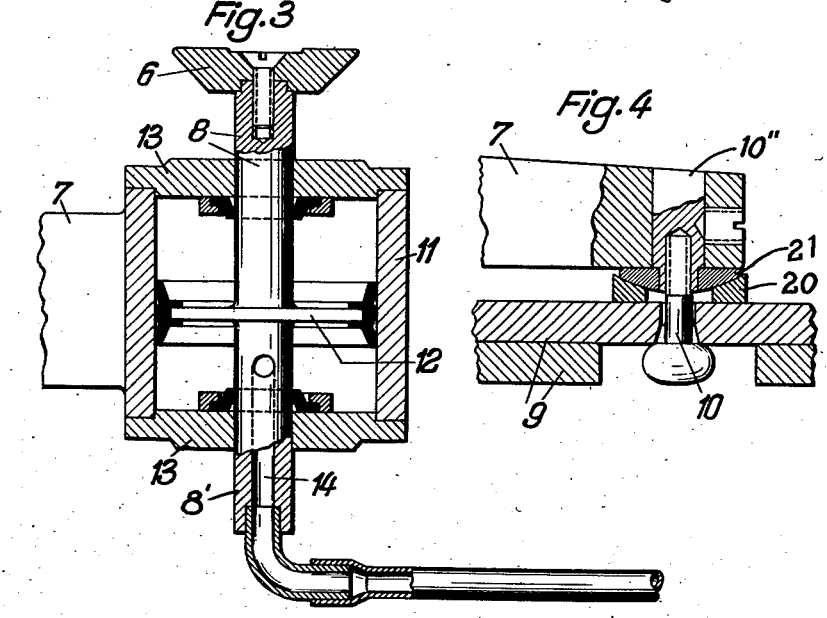
Inventor:
Albert Köberle
By: Michael S. Striker
agt

United States Patent Office 2,816,586
Patented Dec. 17, 1957

2,816,586

SLIDABLY AND ROTATABLY ADJUSTABLE WORK HOLDING STRUCTURE

Albert Köberle, Oberriet, Switzerland, assignor to Firma B. Raimann G. m. b. H., Freiburg im Breisgau, Germany Application November 7, 1955, Serial No. 545,465

Claims priority, application Switzerland December 1, 1954

4 Claims. (Cl. 144—303)

The present invention relates to a work holding structure and in particular to a structure adapted to hold a workpiece in a position to be worked on.

One of the objects of the present invention is to provide a structure capable of holding a workpiece in a manner which enables the entire periphery of the workpiece to be cut, for example.

Another object of the present invention is to provide a structure for holding a workpiece in such a way that clamps which clamp the structure are movable while remaining in clamping engagement with the work to enable the entire periphery of the work to be worked on.

A further object of the present invention is to provide a structure of the above type which may be easily adjusted to support workpieces of different sizes.

Also, it is an object of the present invention to provide a structure capable of accomplishing the above objects and also capable of clamping a template together with the workpiece in an operating position.

With the above objects in view the present invention mainly consists of an apparatus for holding a workpiece in a position to be worked on, this apparatus including a support means and a pair of work carriers movably carried by the support means for movement toward and away from each other, each of these carriers having an upper flange the top face of which is adapted to engage the work. A pair of C-clamps respectively have lower legs removably connected to the flanges of the carriers at the bottom faces thereof and these clamps respectively have upper legs extending over the flanges, respectively, so that the work may be clamped between the top faces of the flanges and the upper legs of the C-clamps.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a partly broken away side elevational view of a work supporting structure according to the present invention;

Fig. 2 is an end view of the structure of Fig. 1;

Fig. 3 is a sectional elevational view on an enlarged scale and illustrating the structure at the end of the lower leg of each C-clamp; and Fig. 4 is a fragmentary sectional view on an enlarged scale illustrating the structure at the end of the upper leg of each C-clamp.

Referring now to the drawings, it will be seen that the structure of the invention is carried by a table 1 which forms a support means for the structure of the invention. This table 1 has a pair of opposite, parallel side edges to which a pair of rails 2 of circular cross section are fixed in any suitable way, these rails 2 being parallel to each other. A pair of elongated work carriers 3 are spaced from each other and extend across the table 1. Each work carrier 3 is in the form of a channel having a web which extends upwardly from the table 1. Each work carrier 3 includes a lower side flange which is located next to the top of the table 1 and an upper flange having a bottom face formed with a dovetail groove 5 extending longitudinally along the upper flange of each work carrier 3. These work carriers are substantially parallel to each other and ride on the rails 2. As is apparent from the lower right and left portions of Fig 2 suitable screws and nuts are provided to urge a clamping member into engagement with each rail 2 for fixing the work carriers 3 in an adjusted position on the rails 2.

A block 6 of dovetail cross section is slidable within each dovetail groove 5, and this block 6 together with the dovetail groove forms a dovetail guide means for guiding a C-clamp 7 along the upper flange of each work carrier 3.

As is shown most clearly in Fig. 3, each block 6 is connected to the top end of a piston rod 8 which extends slidably through the top wall 13 of a cylinder 11, a suitable gland being provided to seal the place where the rod 8 extends through the top wall 13 of the cylinder 11. A piston 12 is slidable within the cylinder 11 and is fixed to the piston rod 8, a suitable flexible sealing ring slidably engaging the inner surface of cylinder 11 and being carried by the piston 12 in the manner indicated in Fig. 3. An additional piston rod coaxial with rod 8 is fixed to the piston 12 and extends downwardly through the lower wall of cylinder 11, a sealing gland being provided at this portion of the cylinder also in the manner indicated in Fig. 3. This additional lower piston rod 8' is formed with an axial bore 14 which communicates at its upper end with a bore passing transversely through the lower piston rod so that the bore 14 communicates with the chamber located between the bottom wall 13 of cylinder 11 and the piston 12. A suitable flexible conduit means indicated fragmentarily in the drawings communicates with the bore 14 to conduct to the latter a fluid under pressure so that when the fluid under pressure is admitted through the bore 14 to the cylinder 11 the piston 12 and the lower wall 13 will be urged away from each other. Thus, the piston 12 and cylinder 11 may cooperate with each other either pneumatically or hydraulically.

Each cylinder 11 is fixed to the free end of a lower arm of C-clamp 7, these lower arms of the C-clamp respectively extending beneath the upper flanges of the carrier 3, as indicated in Fig. 1. Thus, when the blocks 6 are respectively in the grooves 5 the C-clamps 7 are carried by the carriers 3 and are turnable with respect to the pistons, the cylinders turning together with the C-clamps. Furthermore, the C-clamps may be moved to any position along the carriers 3 because of the cooperation of blocks 6 with grooves 5, respectively.

As is indicated in Fig. 4, the upper leg of each C-clamp 7 has a pin 10' fixed thereto and formed with a threaded bore into which a screw member 10 threadedly extends. The screw member 10 turnably supports a washer-like pressure member 9 made up of the interconnected sections shown at the lower portion of Fig. 4. A washer 20 having a top spherical concave face engages the bottom convex spherical face of a washer 21 so that considerable freedom of movement is provided for the pressure member 9. In order to fix the carrier members 3 at an adjusted distance from each other, rods 15 are respectively fixed to and extend toward each other from the carriers 3, as indicated in Fig. 1, and these rods 15 have threaded free end portions which are oppositely threaded and which cooperate with opposite threads formed in a tubular member so that this member may be turned in a manner similar to a turnbuckle to cause the rods 15 to approach or recede from each other and in this way the distance between the work carriers 3 may be regulated.

The above-described structure operates as follows:

When a particular workpiece 4 is to be supported to have its periphery cut, for example, this workpiece 4 being made of wood, for example, then the carriers 3 are moved along the rails 2 until they are at an appropriate distance from each other, as indicated in Fig. 1, and the workpiece 4 is simply placed on the top faces of the upper flanges of the carriers 3 with the periphery of the workpiece 4 extending beyond the carriers 3. Then the slide blocks 6 together with C-clamps 7 are shifted to an appropriate portion of the workpiece with the pressure members 9 engaging the top face of the workpiece. It will be noted that the axes of turning of pressure members 9 provided by the pins 10' are coaxial with the piston rods 8, respectively.

When the C-clamps are located at a desired position with respect to the work, a suitable valve, which is not shown, is open to admit fluid under pressure into the cylinders 11 beneath the pistons 12. As a result of the cylinders 11 together with the C-clamps 7 will be urged downwardly with respect to the pistons 12 with the result that the pressure members 9 clamp the workpiece 4 to the carriers 3. Then a suitable wood cutting tool, for example, may be used to cut the periphery of the workpiece as desired. A template may be clamped together with the workpiece by the C-clamps 7, if desired. When the cutting tool approaches a clamp 7, the latter may be turned about the common axis of the piston and pressure member 9 in either direction, without disturbing the clamping of the work, and in this way it is possible for the cutting tool to engage the entire periphery of the workpiece 4.

Of course, work carriers 3 and C-clamps 7 in addition to those indicated above may be provided, and a plurality of C-clamps may be provided on each carrier 3, if desired.

Furthermore, instead of a pneumatic or hydraulic force for providing the clamping action, levers, screws and the like may be used for urging the pressure member 9 toward each carrier 3.

It will be understood that each of the elements described above, or two or more together, may also find a useful application in other types of work supports differing from the types described above.

While the invention has been illustrated and described as embodied in a support for a workpiece to be worked on, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. For use in an apparatus for holding a workpiece in a position to be worked on, in combination, a C-clamp having a pair of opposite legs; a pressure member carried by one of said legs at a free end thereof for free turning movement with respect to said one leg; a cylinder fixed to and carried by the other of said legs at a free end thereof; a piston slidable in said cylinder; a piston rod fixed to said piston and extending through an end wall of said cylinder toward said pressure member, the latter being turnable about the axis of said piston rod; and a second piston rod fixed to said piston, extending through the opposite end wall of said cylinder, and formed with a bore communicating with the interior of said cylinder so that a fluid under pressure may be conducted through said piston rod into said cylinder for clamping structure located between said pressure member and the first mentioned piston rod.

2. For use in an apparatus for holding a workpiece in a position to be worked on, in combination, a C-clamp having a pair of opposite legs; a pressure member carried by one of said legs at a free end thereof for free turning movement with respect to said one leg; a cylinder fixed to and carried by the other of said legs at a free end thereof; a piston slidable in said cylinder; a piston rod fixed to said piston and extending through an end wall of said cylinder toward said pressure member, the latter being turnable about the axis of said piston rod; a block of dovetail cross section rotatably connected to the end of said piston rod located outside of said cylinder; and a second piston rod fixed to said piston, extending through the opposite end wall of said cylinder, and formed with a bore communicating with the interior of said cylinder so that a fluid under pressure may be conducted through said piston rod into said cylinder for clamping structure located between said pressure member and the first mentioned piston rod.

3. Apparatus for holding a workpiece in a position to be worked on, comprising in combination, a table having a pair of opposed parallel side edges; a pair of elongated channel members extending across said table, said channel member each having a web extending upwardly from said table and each having a lower side flange located adjacent and being substantially parallel to the top of said table and an upper flange substantially parallel to and located over said lower flange; means connecting said lower flanges to said side edges of said table for slidable movement therealong; a first C-clamp having a lower leg extending beneath the upper flange of one of said channel members and having an upper leg extending over the upper flange of said channel member; a second C-clamp having a lower leg extending beneath the upper flange of the other of said channel member and having an upper leg extending over the upper flange of said other channel member; a pressure member respectively carried for turning movement by each of said upper legs over said upper flanges so that when said pressure members engage a workpiece said C-clamps are still turnable with respect to said pressure members; a cylinder fixed to said free end of each of said lower legs of said C-clamps beneath said upper flanges; a piston slidable in each of said cylinders; a piston rod fixed to each of said pistons and extending therefrom upwardly beyond said cylinder toward said upper flange; and dovetail guide means fixed to the upper portion of each of said piston rods and engaging said flanges for guiding said C-clamps for movement therealong.

4. Apparatus for holding a workpiece in a position to be worked on, comprising, in combination, a table having a pair of opposed parallel side edges; a pair of elongated channel members extending across said table, said channel members each having a web extending upwardly from said table and each having a lower side flange located adjacent and being substantially parallel to the top of said table and an upper flange substantially parallel to and located over said lower flange; means connecting said lower flanges to said side edges of said table for slidable movement therealong; a first C-clamp having a lower leg extending beneath the upper flange of one of said channel members and having an upper leg extending over the upper flanges of said channel member; a second C-clamp having a lower leg extending beneath the upper flange of the other of said channel member and having an upper leg extending over the upper flange of said other channel member; a pressure member carried for turning movement by each of said upper legs over said upper flanges so that when said pressure members engage a workpiece said C-clamps are still turnable with respect to said pressure members; a cylinder fixed to said free ends of each of said lower legs of said C-clamps beneath said upper flanges; a piston slidable in each of said cylinders; a piston rod fixed to each of said pistons and extending therefrom upwardly beyond said cylinder toward said upper flange; dovetail guide means fixed to the upper portion of each of said piston rods and engaging said flanges for guiding said C-clamps for movement therealong; and an additional piston rod fixed to each of said pistons and extending therefrom downwardly beyond said cylinder, said latter piston rods being formed with bores communicating with the interior of said cylinders so that a fluid under pressure may be conducted through said additional piston rods into said cylinders.

References Cited in the file of this patent

UNITED STATES PATENTS

| | | |
|---|---|---|
| 101,126 | Hayes | Mar. 22, 1870 |
| 291,248 | West | Jan. 1, 1884 |
| 1,497,107 | Lasell | June 10, 1924 |
| 1,685,572 | Onsrud | Sept. 25, 1928 |
| 2,533,413 | Williams | Dec. 12, 1950 |
| 2,623,560 | Joseph | Dec. 30, 1952 |